United States Patent [19]

Walters

[11] 4,157,979

[45] Jun. 12, 1979

[54] AZEOTROPIC COMPOSITIONS

[75] Inventor: Harold C. Walters, Bartlesville, Okla.

[73] Assignee: Phillips Petroleum Company, Bartlesville, Okla.

[21] Appl. No.: 894,285

[22] Filed: Apr. 7, 1978

[51] Int. Cl.$^2$ .............................................. C11D 7/30
[52] U.S. Cl. .................................... 252/162; 252/66; 252/67; 252/364; 252/DIG. 9; 260/653
[58] Field of Search .................. 252/162, 66, 67, 364, 252/DIG. 9; 260/653

[56] References Cited

U.S. PATENT DOCUMENTS 3,887,629   6/1975   Fozzard .............................. 260/653

Primary Examiner—Mayer Weinblatt

[57] ABSTRACT

Azeotropic compositions are formed with n-butane, 1,1,2,2,3,3,4,4,4-nonafluoro-n-butane and 1,1,1,2,3,3,4,4,4-nonafluoro-n-butane.

3 Claims, No Drawings

AZEOTROPIC COMPOSITIONS

This invention relates to azeotropic compositions.

A continuing problem in refrigeration is that there exists only a limited number of properly low-boiling, liquefied gases having properties suitable for refrigeration purposes. In addition to being low boiling, other important properties which a useful refrigerant must possess are low toxicity, nonflammability, freedom from odor, high chemical and thermal stability. In view of the stringent physical property requirements, only a limited number of the halogenated hydrocarbons are useful as refrigerants. These halocarbons do not always overlap in boiling points. Consequently, there are gaps in the range of the normal boiling points of refrigerants where no single refrigerant is available. Since the design of refrigeration units is dependent to a large extent upon the boiling point of the refrigerant used, it is desirable to have refrigerants of varying boiling points to gain flexibility in design specifications.

Accordingly, it is an object of this invention to provide azeotropic compositions which are useful as refrigerating agents.

Other objects and advantages of the invention will become apparent from the following description and appended claims.

I have discovered that n-butane, 1,1,2,2,3,3,4,4,4,-nonafluoro-n-butane and 1,1,1,2,3,3,4,4,4,-nonafluoro-n-butane together form at least one azeotrope.

Although the azeotropic compositions of this invention are formed at substantially atmospheric pressure, a wide variation in pressure and consequently a change in the compositions and boiling points are also intended to be within the broad scope of this invention. Thus the azeotropes of this invention may contain many different proportions of the aforementioned components provided a constant boiling mixture is obtained at the various pressures at which the compositions are used. Stated otherwise, any pressure may be employed to obtain the azeotropes of this invention as long as a three-component constant boiling mixture is obtained, and accordingly the ratio of components of the azeotropes of the invention will vary. The variation of components is thus within the skill of the art and is easily determined once it is known that the halogenated hydrocarbons of this invention will form the aforementioned azeotropes.

The ternary admixtures of this invention contain n-butane, 1,1,1,2,3,3,4,4,4-nonafluoro-n-butane and 1,1,2,2,3,3,4,4,4-nonafluoro-n-butane characterized by a boiling point of about −6° to −6.5° C. at substantially atmospheric pressure. These components together form these unique boiling admixtures which broadly are characterized at substantially atmospheric pressure as containing about 30 to 35 weight percent n-butane, about 62 to 66 weight percent 1,1,1,2,3,3,4,4,4-nonafluoro-n-butane and about 1 to 5 weight percent 1,1,2,2,3,3,4,4,4-nonafluoro-n-butane.

These azeotropes may be used in domestic and commercial refrigerators and freezers, industrial cooling systems and air-conditioning systems, or in any other system in which cooling is effected by the vaporation of liquid refrigerant.

The following examples illustrate the invention.

EXAMPLE I

A 12.4 kg admixture of n-butane, perfluoro-n-butane (decafluoro-n-butane), isomeric nonafluoro-n-butanes and toluene was fractionally distilled at atmospherhic pressure (about 740 mm Hg). The mixture was obtained by toluene extraction and distillation of an effluent from an electrochemical fluorination of n-butane followed by addition of more n-butane. In Table I the results of the fractional distillation are recorded.

TABLE I

| Fraction No. | 1 | 2 | 3 | R[1] |
|---|---|---|---|---|
| Temperature, °C.[2] | −13.8 to −13.4 | −13.4 to −7.0 | −6.5 to −6.0 | — |
| Weight, kg | 7.38 | 2.38 | 1.36 | 0.68 |
| Composition, Weight % | | | | |
| Perfluoro-n-butane | 81.3 | 65.4 | 0.3 | 0 |
| n-Butane | 18.4 | 20.8 | 33.3 | 0.2 |
| Nonafluoro-n-butane | 0.3 | 13.8 | 66.4 | 81.2[3] |
| Other | 0 | 0 | 0 | 18.6[4] |

[1]Undistilled residue.
[2]Measured in vapor at top of distillation column.
[3]76.0 weight percent 1,1,2,3,3,4,4,4-nonafluoro-n-butane (2-H isomer) and 5.1 weight percent 1,1,2,2,3,3,4,4,4-nonafluoro-n-butane (1-H isomer).
[4]Toluene.

Fraction number 3 in Table I represents an azeotrope within the scope of the present invention. The ratio of the isomers of nonafluoro-n-butane in Fraction 3 was not determined. However, since the undistilled residue R contained 76.1 weight percent of the 2-H isomer and 5.1 weight percent of the higher boiling 1-H isomer, it can be calculated that Fraction 3 contained less than about $$\frac{5.1}{76.1 + 5.1} (100)$$

or 6.3 weight percent 1-H isomer and more than about 93.7 weight percent 2-H isomer. The amount of each isomer in the nonafluoro-n-butane was calculated to be less than about (66.4) (6.3) or 4.2 (about 4) weight percent 1-H isomer and more than about (66.4) (93.7) or 62.2 (about 63) weight percent 2-H isomer.

Fraction number 3 also contained 33.3 (about 33) weight percent n-butane.

EXAMPLE II

The following run establishes the identity of the compositions of the present invention as an azeotrope.

Pure n-butane and an isomeric mixture containing 7.12 weight percent 1,1,2,2,3,3,4,4,4-nonafluoro-n-butane, 92.56 weight percent 1,1,1,2,3,3,4,4,4-nonafluoro-n-butane and 0.32 weight percent higher boiling materials were blended in various proportions and the boiling points of the resultant mixtures were determined at atmospheric pressure (743 mm Hg).

The apparatus for determining boiling points consisted of a 50 ml flask fitted with a 15 cm condenser which contained coolant at −50° C. in the jacket. A thermometer extended through the condenser with the bulb in the 50 ml flask. The liquid mixture to be measured was inserted into the flask and allowed to boil at which time the temperature of the boiling liquid was observed.

The compositions of the above-described blends and the boiling points thereof are recorded in Table II.

TABLE II

| Run No. | Composition, wt. % | | Temp., ° C. |
|---|---|---|---|
| | n-$C_4H_{10}$ | n-$C_4F_9H$ | |
| 1 | 100 | 0 | −2.0 |
| 2 | 70.35 | 29.65 | −6.2 |
| 3 | 44.16 | 55.84 | −7.6 |
| 4 | 32.87 | 67.13 | −6.8 |
| 5 | 20.86 | 79.14 | −2.8 |
| 6 | 8.08 | 91.92 | −6.2 |
| 7 | 0 | 100 | +10.5 |

The above data illustrate that a boiling point minimum was achieved around Runs 3 and 4. One skilled in the art will appreciate that the small size and simplicity of the apparatus, the low temperatures involved, and the high volatility of the liquids at atmospheric pressure render the measurement of accurate boiling points under these conditions difficult. Hence, the data in Table II should be regarded as approximate and useful only in showing trends in boiling point.

Reasonable variations and modifications, which will be apparent to those skilled in the art, can be made in this invention without departing from the spirit and scope thereof.

I claim:

1. A boiling admixture which at substantially atmospheric pressure is characterized as from about 30 to about 35 weight percent n-butane, from about 62 to about 66 weight percent 1,1,1,2,3,3,4,4,4-nonafluoro-n-butane and from about 1 to about 5 weight percent 1,1,2,2,3,3,4,4,4-nonafluoro-n-butane.

2. An admixture having a substantially constant boiling point characterized as from about 30 to about 35 weight percent n-butane, from about 62 to about 66 weight percent 1,1,1,2,3,3,4,4,4-nonafluoro-n-butane and from about 1 to about 5 weight percent 1,1,2,2,3,3,4,4,4-nonafluoro-n-butane at the admixtures substantially constant boiling point at substantially atmospheric pressure.

3. The azeotrope according to claim 2 characterized by a boiling point in the range of about −6° to −6.5° C. at about 740 mm pressure.

* * * * *

UNITED STATES PATENT AND TRADEMARK OFFICE
CERTIFICATE OF CORRECTION

PATENT NO. : 4,157,979

DATED : June 12, 1979

INVENTOR(S) : Harold C. Walters

It is certified that error appears in the above-identified patent and that said Letters Patent are hereby corrected as shown below:

Column 4, lines 8-13, delete claim 1; line 14, delete "2" and substitute --- 1 ---; after line 21 and before claim 3 insert: ---

2. An azeotrope which at substantially atmospheric pressure is characterized as about 33 weight percent n-butane, about 63 weight percent 1,1,1,2,3,3,4,4,4-nonafluoro-n-butane and about 4 weight percent 1,1,2,2,3,3,4,4,4-nonafluoro-n-butane. ---

Signed and Sealed this

Twenty-third Day of October 1979

[SEAL]

Attest:

RUTH C. MASON
*Attesting Officer*

LUTRELLE F. PARKER
*Acting Commissioner of Patents and Trademarks*